(12) United States Patent
Zhou et al.

(10) Patent No.: US 12,415,225 B2
(45) Date of Patent: Sep. 16, 2025

(54) HANDHELD BAND SAW

(71) Applicant: Nanjing Chervon Industry Co., Ltd., Nanjing (CN)

(72) Inventors: Yang Zhou, Nanjing (CN); Hao Gao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 52 days.

(21) Appl. No.: 18/446,239

(22) Filed: Aug. 8, 2023

(65) Prior Publication Data

US 2024/0058879 A1 Feb. 22, 2024

(30) Foreign Application Priority Data

Aug. 17, 2022 (CN) .......................... 202210989063.9
Aug. 17, 2022 (CN) .......................... 202222172168.3

(51) Int. Cl.
| | |
|---|---|
| *B23D 53/12* | (2006.01) |
| *B23D 55/02* | (2006.01) |
| *B23D 55/06* | (2006.01) |
| *B23D 55/08* | (2006.01) |

(52) U.S. Cl.
CPC ............ *B23D 53/12* (2013.01); *B23D 55/02* (2013.01); *B23D 55/065* (2013.01); *B23D 55/082* (2013.01)

(58) Field of Classification Search
CPC .... B23D 53/12; B23D 55/065; B23D 55/082; B23D 55/02; B23D 59/006; B23D 55/00; B25F 5/008
USPC ................................... 30/380, 371, 286, 320
See application file for complete search history.

(56) References Cited

U.S. PATENT DOCUMENTS

| | | | | |
|---|---|---|---|---|
| 5,363,558 | A | * 11/1994 | Schroeder | B23D 57/0015 30/500 |
| 2007/0068011 | A1 | * 3/2007 | Shibata | B27B 13/16 30/380 |
| 2013/0333228 | A1 | * 12/2013 | Ota | B23D 47/12 30/273 |
| 2015/0026985 | A1 | * 1/2015 | Yamaguchi | B23D 45/16 30/123 |
| 2022/0263377 | A1 | * 8/2022 | Sasaki | H02K 7/116 |
| 2023/0007824 | A1 | * 1/2023 | Okuhira | B23D 53/12 |
| 2023/0112387 | A1 | * 4/2023 | Kachi | B27B 17/00 30/165 |

FOREIGN PATENT DOCUMENTS

| | | | | |
|---|---|---|---|---|
| CN | 110744135 | A * | 2/2020 | ............. B23D 53/12 |
| EP | 1980352 | A1 * | 10/2008 | ............. B23D 53/12 |
| EP | 3778132 | A1 * | 2/2021 | ......... B01D 46/0005 |

* cited by examiner

*Primary Examiner* — Ghassem Alie
(74) *Attorney, Agent, or Firm* — Greenberg Traurig, LLP

(57) ABSTRACT

A handheld band saw includes a housing assembly including a battery pack mounting portion for mounting a battery pack, a rotating wheel assembly at least partially disposed in the housing assembly and including a first rotating wheel and a second rotating wheel, where the first rotating wheel and the second rotating wheel are configured to be substantially symmetrical about a midplane, an electric motor disposed in the housing assembly and capable of driving one of the first rotating wheel and the second rotating wheel to rotate, a fan which is capable of generating at least one airflow in the housing assembly, and a control circuit board disposed in the housing assembly.

15 Claims, 12 Drawing Sheets

HANDHELD BAND SAW

RELATED APPLICATION INFORMATION

This application claims the benefit under 35 U.S.C. § 119(a) of Chinese Patent Application No. CN 202210989063.9, filed on Aug. 17, 2022, and Chinese Patent Application No. CN 202222172168.3, filed on Aug. 17, 2022, which applications are incorporated herein by reference in their entireties.

BACKGROUND

At present, handheld band saws are widely used and can be used for cutting all machinable metals including stainless steel, pipes, solid bodies, and the like. The handheld band saw has a strong thermal resistance, wear resistance, and vibration resistance and has a longer service life than similar products. Because the handheld band saw has advantages such as flexible and convenient use, the handheld band saw has been widely used in industrial and household scenarios where various types of bars, pipes, and profiles are cut.

A handheld band saw typically controls the running of an electric motor with a control circuit board. When the handheld band saw works, the temperature rise of the electric motor and the temperature rise of the control circuit board are relatively high, and the electric motor and the control circuit board are easily damaged, thereby affecting the use of the handheld band saw.

SUMMARY

A handheld band saw includes: a housing assembly including a battery pack mounting portion for mounting a battery pack; a rotating wheel assembly at least partially disposed in the housing assembly and including a first rotating wheel and a second rotating wheel, where the first rotating wheel and the second rotating wheel are configured to be substantially symmetrical about a midplane; an electric motor disposed in the housing assembly and capable of driving one of the first rotating wheel and the second rotating wheel to rotate; a fan which is capable of generating at least one airflow in the housing assembly during rotation; and a control circuit board disposed in the housing assembly. The housing assembly is formed with an air inlet and an air outlet, and when the fan rotates, the airflow entering the housing assembly from the air inlet flows through at least the control circuit board and the electric motor.

A handheld band saw includes: a housing assembly including a battery pack mounting portion for mounting a battery pack; a rotating wheel assembly at least partially disposed in the housing assembly and including a first rotating wheel and a second rotating wheel, where the first rotating wheel and the second rotating wheel are configured to be substantially symmetrical about a midplane; an electric motor disposed in the housing assembly and capable of driving one of the first rotating wheel and the second rotating wheel to rotate; a control circuit board disposed in the housing assembly; and a fan which is capable of generating at least one airflow flowing through the control circuit board in the housing assembly during rotation.

The control circuit board and the electric motor are located on the same side of the midplane.

A handheld band saw includes: a housing assembly; an electric motor disposed in the housing assembly; a fan capable of being driven by the electric motor and capable of generating at least one airflow in the housing assembly during rotation; and a control circuit board disposed in the housing assembly. The housing assembly is formed with an air inlet and an air outlet, and when the fan rotates, at least one airflow entering the housing assembly from the air inlet passes through at least the control circuit board and the electric motor.

DETAILED DESCRIPTION

Figure 1:
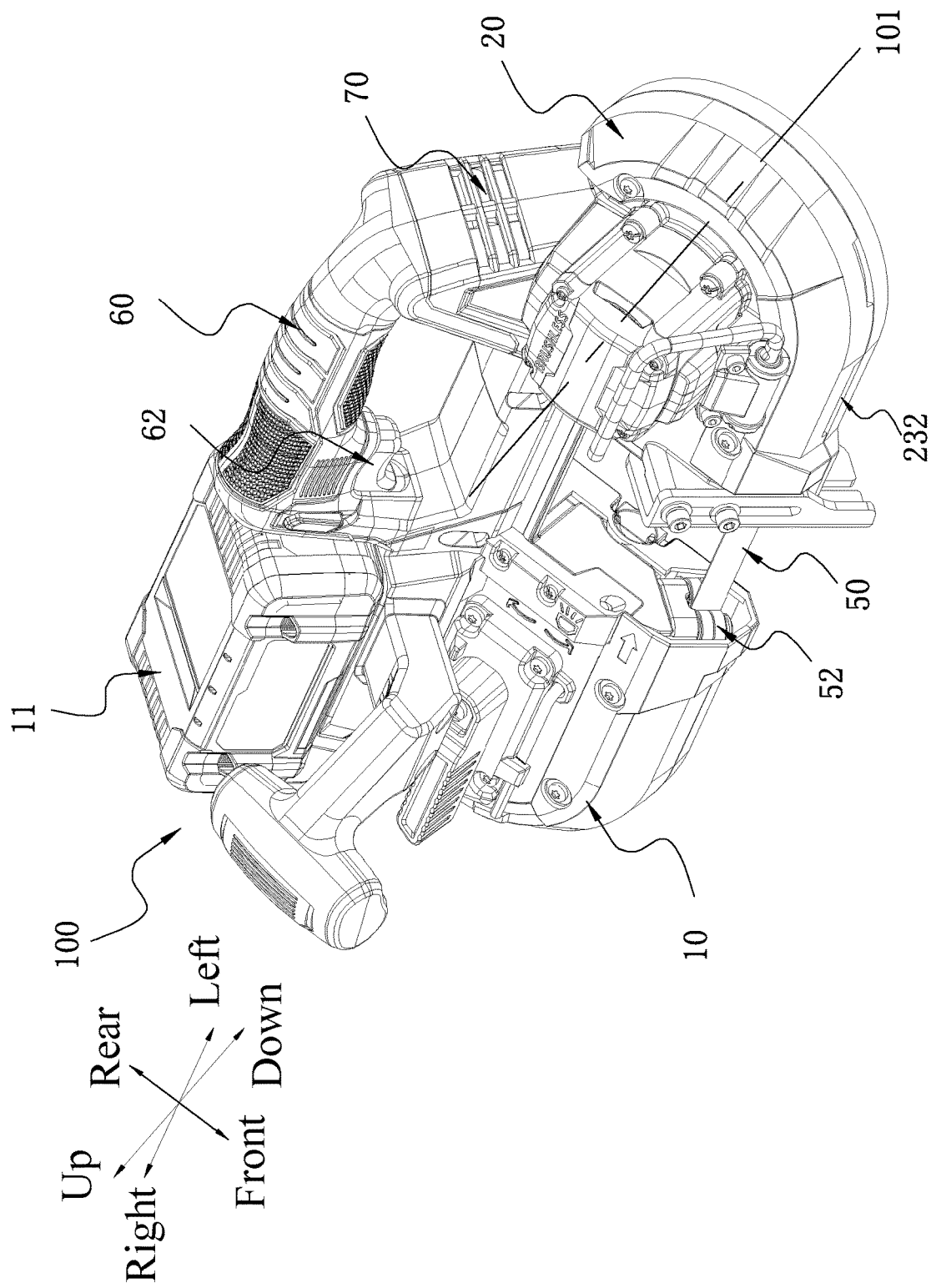
FIG. 1 is a perspective view of a handheld band saw in the present application.
Figure 2:
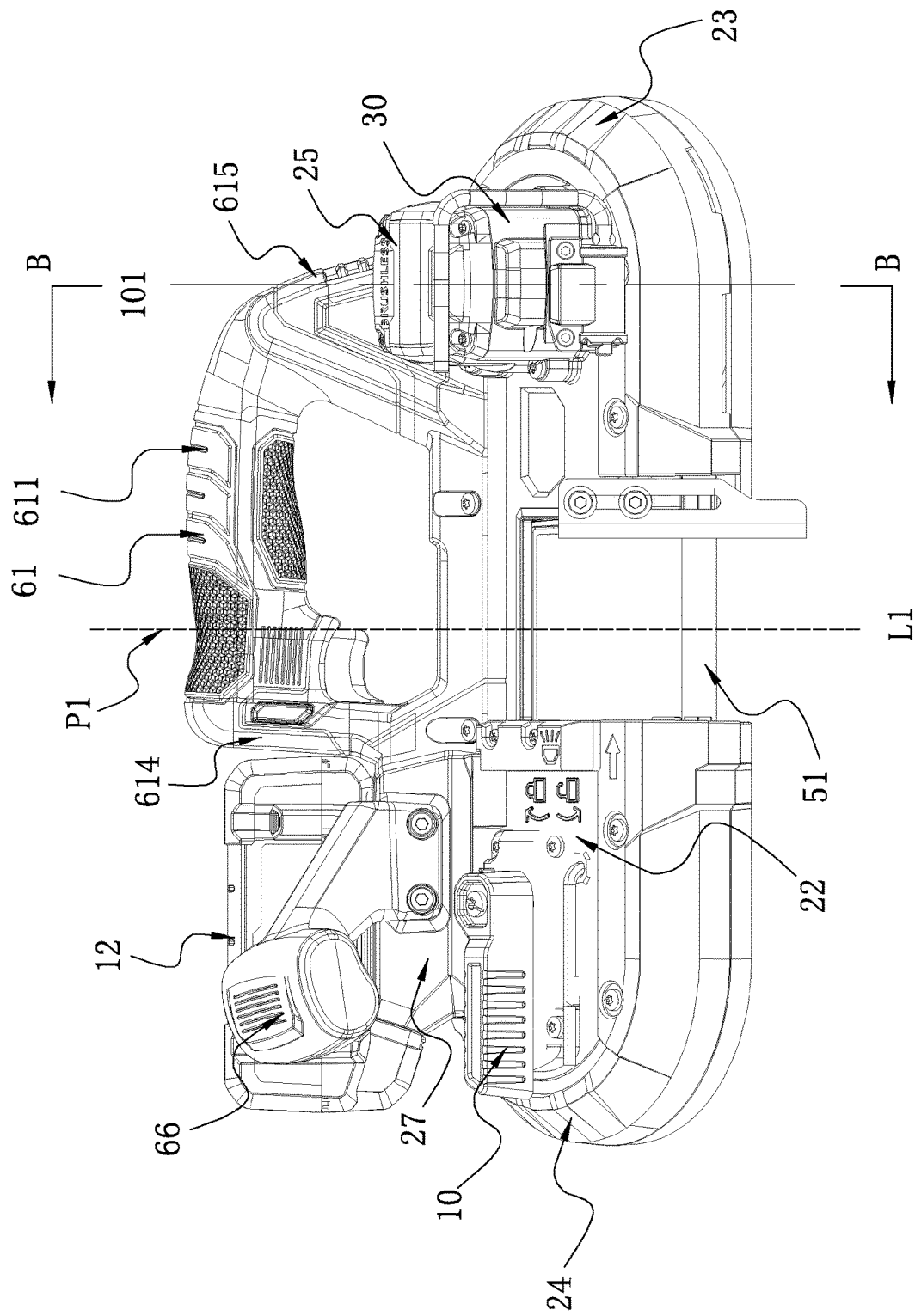
FIG. 2 is a plan view of the handheld band saw shown in FIG. 1.
Figure 3:
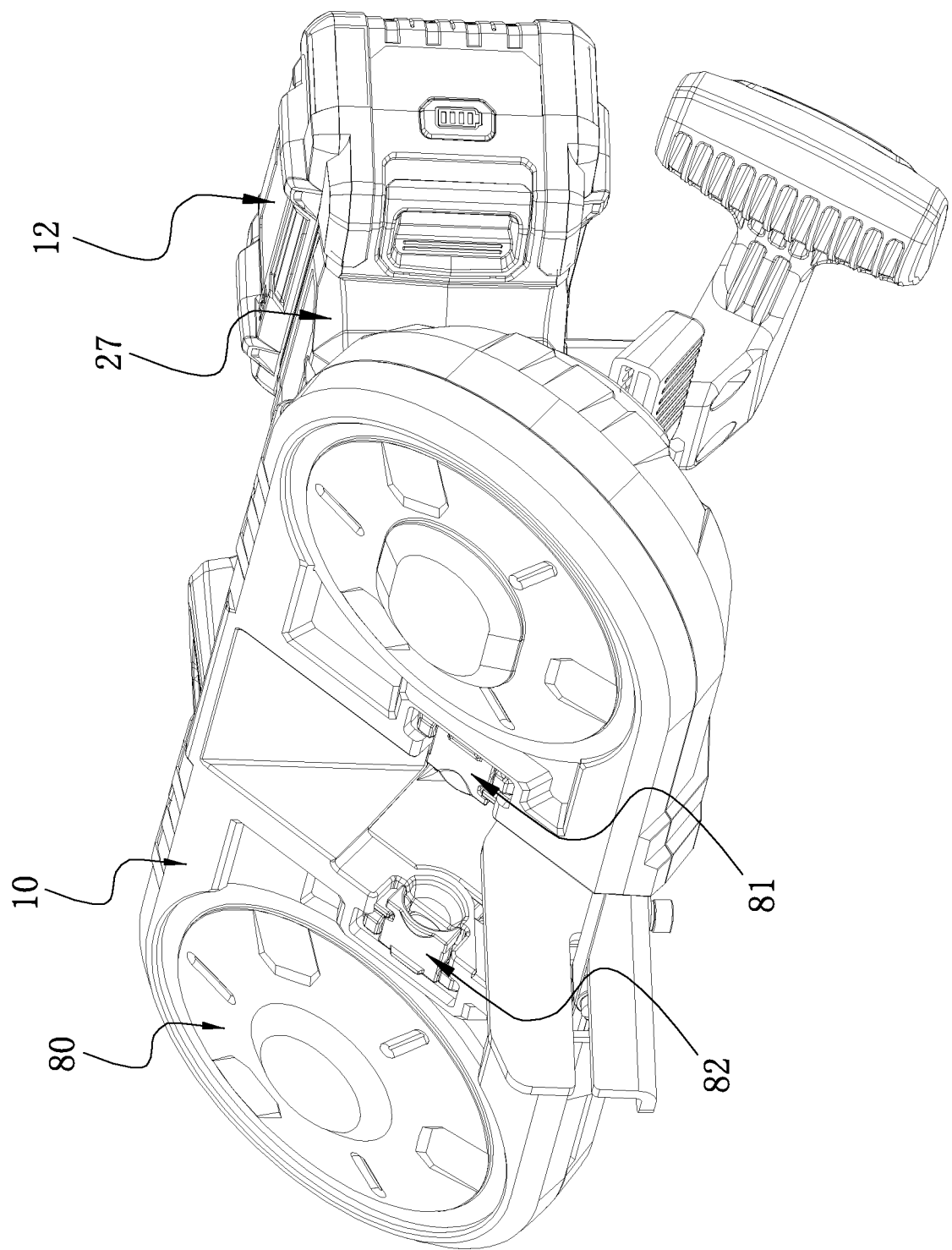
FIG. 3 is a perspective view of the handheld band saw shown in FIG. 1 from another angle of view.
Figure 4:
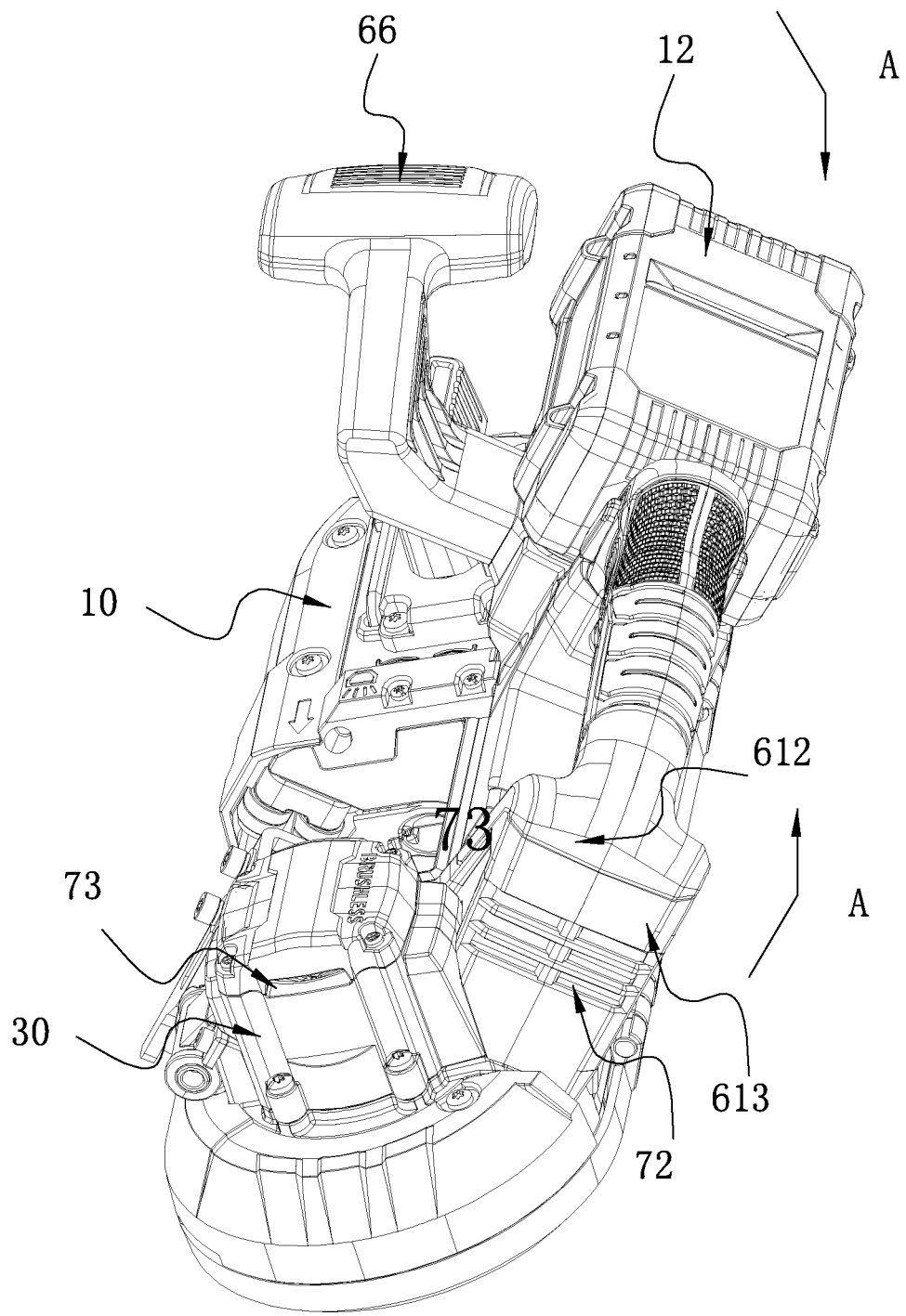
FIG. 4 is a perspective view of the handheld band saw shown in FIG. 1 from another angle of view.

FIG. 1 shows a power tool, which is specifically a handheld band saw 100. The handheld band saw may drive a functional element 51 to move. The functional element 51 is specifically a saw blade. In this manner, the handheld band saw 100 may drive the saw blade to cut pieces to be cut. The pieces to be cut are all machinable metals including stainless steel, pipes, solid bodies, and the like.

To clearly illustrate the technical solutions of the present application, up, down, front, rear, left, and right as shown in FIG. 1 are defined.

Referring to FIGS. 1 to 4, an example of the present disclosure provides a power tool, which is specifically the handheld band saw 100. The handheld band saw 100 of the present disclosure includes a main body 10 and an energy source 11. The main body 10 includes a housing assembly 20, a power assembly 30, a rotating wheel assembly 40, a cutting assembly 50, a handle assembly 60, a switch assembly 62, a heat dissipation device 70, and a shield assembly 80. The energy source 11 may be specifically a direct current or an alternating current. In this example, the energy source 11 is specifically a battery pack 12.

The housing assembly 20 is a main part constituting the appearance of the handheld band saw 100. The housing assembly 20 has a first space 21 for at least partially accommodating various components in the handheld band saw 100. That is, the power assembly 30, the rotating wheel assembly 40, the cutting assembly 50, the switch assembly 62, and the heat dissipation device 70 are at least partially disposed in the first space 21.

The power assembly 30 is used for providing power for the handheld band saw 100. The power tool includes an electric motor 31 including an electric motor shaft 32 rotatable about an electric motor axis 101. The electric motor shaft 32 has a first distance D1 along the direction of the electric motor axis 101. It is to be noted that in this example, the extension direction of the electric motor axis 101 substantially coincides with an up and down direction.

The rotating wheel assembly 40 is used for transmitting the power from the power assembly 30 to the cutting assembly 50. The rotating wheel assembly 40 includes a first rotating wheel 41 and a second rotating wheel 42, and the electric motor 31 can drive the first rotating wheel 41 and/or the second rotating wheel 42 to move. In the present application, the electric motor 31 drives the first rotating wheel 41 to rotate about a first axis. The first rotating wheel 41 and the second rotating wheel 42 are spaced to form a cutting region 26 and are configured to be substantially symmetrical about a midplane P1. The first axis is parallel to or coincides with the electric motor axis 101.

In fact, the housing assembly 20 includes a main housing 22, a first rotating wheel housing 23, a second rotating wheel housing 24, and an electric motor housing 25. The first rotating wheel 41 and the second rotating wheel 42 are connected to the main housing 22. The first rotating wheel housing 23 is formed with a first open space 231, and the second rotating wheel housing 24 is formed with a second open space 241. The first rotating wheel 41 is substantially accommodated in the first open space 231, and the second rotating wheel 42 is substantially accommodated in the second open space 241, that is to say, the first rotating wheel housing 23 substantially accommodates the first rotating wheel 41, and the second rotating wheel housing 24 substantially accommodates the second rotating wheel 42. The first rotating wheel housing 23, the second rotating wheel housing, and the electric motor housing 25 are fixedly connected to the main housing 22. The midplane P1 is a virtual plane. The main housing 22, the first rotating wheel housing 23, and the electric motor housing 25 may be made of different materials, and the main housing 22 may be made of aluminum alloy. The cutting assembly 50 is used for outputting the power and includes the functional element 51, that is, the saw blade. The functional element 51 connects the first rotating wheel 41 to the second rotating wheel 42 and drives the second rotating wheel 42 to move synchronously with the first rotating wheel 41. When the main body 10 moves, the functional element 51 moves with the first rotating wheel 41. During the movement, the functional element 51 is at least partially located in the cutting region 26. The functional element 51 located in the cutting region 26 approaches a piece to be cut to cut it. The cutting assembly 50 further includes two pairs of guide assemblies 52 disposed opposite to each other and configured to be symmetrical about the midplane P1. The guide assemblies 52 are disposed near the cutting region 26. In addition, with the guide assemblies 52, part of the saw blade located in the cutting region 26 performs cutting along a first cutting direction 103.

The handle assembly 60 includes a main handle 61. The housing assembly 20 is connected to or formed with the main handle 61. The housing assembly 20 includes the main handle 61 including a right end 614, a left end 615, and a handle portion 611 for a user to hold. The handle portion 611 is configured to be substantially symmetrical about a handle midplane P2. The handle midplane P2 is the virtual plane. The main handle 61 includes a first handle housing portion 612 and a second handle housing portion 613. The first handle housing portion 612 and the second handle housing portion 613 are detachably assembled to form a hollow accommodating space 65. In the present application, the main handle 61 is part of the housing assembly 20.

The switch assembly 62 is used for controlling the electric motor 31 to be turned on and off. The switch assembly 62 is coupled to a control circuit board 64 for connecting the switch assembly 62 to the electric motor 31. The switch assembly 62 is mounted on the handle portion 611, that is, the switch assembly 62 and the control circuit board 64 are at least partially disposed in the accommodating space 65. With this configuration, the user can conveniently trigger the switch assembly 62 when holding the handle portion 611.

As shown in FIGS. 1 to 4, the housing assembly 20 is connected to or formed with a battery pack mounting portion 27 for mounting the battery pack 12. The battery pack mounting portion 27 is configured to be adjacent to the main handle 61, and when the battery pack 12 is mounted on the mounting base of the battery pack 12, the handle midplane P2 passes through the battery pack 12. Along a left and right direction, the battery pack mounting portion 27 and the electric motor 31 are disposed on two sides of the midplane P1. The battery pack 12 and the electric motor 31 are heavier than other components of the handheld band saw 100. The battery pack 12 and the electric motor 31 are disposed at two ends of the handheld band saw 100 separately so that the overall weight of the handheld band saw 100 can be relatively balanced when the battery pack 12 is mounted on the main body 10. The case does not occur where the handheld band saw 100 is relatively heavy on one side, resulting in that the whole handheld band saw 100 is oblique to the side when being held and performing the cutting. Thus, the operation of the user is facilitated.

The heat dissipation device 70 is used for dissipating the heat of the electric motor 31. The heat dissipation device 70 includes a fan 71. The fan 71 can be driven by the electric motor shaft 32 to rotate. When the fan 71 rotates, at least one airflow is formed, and the airflow enters the inside of the housing assembly 20 from an air inlet and then flows out from an air outlet. On a flow path of the airflow, the airflow passes through at least the electric motor 31 and the control circuit board 64, thereby dissipating the heat of the control circuit board 64 and the heat of the electric motor 31.

As an example, the housing assembly is formed with multiple air inlets. An airflow is formed and enters the housing assembly from each of the air inlets, that is to say, at least two airflows are formed when the fan rotates. One airflow flows through the electric motor and is used for dissipating the heat of the electric motor, the other airflow flows through the control circuit board and is used for dissipating the heat of the control circuit board, and finally the two airflows combine to flow out from the air outlet. The two airflows may flow out from multiple air outlets separately.

As another example, the housing assembly is formed with multiple air inlets. An airflow is formed and enters the housing assembly from each of the air inlets, that is to say, at least two airflows are formed when the fan rotates. One airflow flows through the electric motor and is used for dissipating the heat of the electric motor, the other airflow flows through the control circuit board and the electric motor and is used for dissipating the heat of the control circuit board and the heat of the electric motor, and finally the two airflows combine to flow out from the air outlet. The two airflows may flow out from multiple air outlets separately.

As another example, the housing assembly is formed with one or more air inlets. An airflow is formed and enters the housing assembly from each air inlet, that is to say, at least one airflow is formed when the fan rotates. The one or more airflows each flow through the electric motor and the control circuit board and finally flow out from the air outlet. This example is described in detail below.

When the fan 71 rotates, an airflow A is formed. The airflow A enters the inside of the housing assembly 20 from an air inlet 72 and flows out from an air outlet 73. On a flow path of the airflow A, the airflow A passes through at least the electric motor 31 and the control circuit board 64 to dissipate the heat of the control circuit board 64 and the heat of the electric motor 31.

When the fan 71 rotates, the airflow A enters the housing assembly 20 from the air inlet 72, and on the flow path of the airflow A, the airflow A passes through the control circuit board 64, then flows to the electric motor 31, and finally flows out from the air outlet 73. When the handheld band saw 100 runs, the electric motor 31 rotates at a high speed and generates a large amount of heat. That is, the heat generated by the electric motor 31 is greater than the heat generated by the control circuit board 64. That is to say, the temperature of the airflow A flowing through the electric motor 31 is bound to be higher than the temperature of the airflow A flowing through the control circuit board 64. With the preceding configuration, the airflow A dissipates the heat of the control circuit board 64 and the heat of the electric motor 31 better so that it is ensured that the control circuit board 64 and the electric motor 31 run normally. In some possible examples, the air inlet 72 and the air outlet 73 are each disposed on one side of the midplane P1. With this configuration, the heat dissipation effect of the handheld band saw 100 can be ensured, and the dissipation structure is simple.

The main handle 61 is provided with the inlet of the airflow A, and the electric motor housing 25 is provided with the outlet of the airflow A. The fan 71 may be a centrifugal fan 71. When the fan 71 rotates, the centrifugal fan 71 generates negative pressure, and the airflow A is drawn into the accommodating space 65 of the main handle 61 from the inlet of the airflow A, then flows into the interior space 251 of the electric motor housing 25, and is finally discharged from the air outlet 73 of the electric motor housing 25, thereby performing the heat dissipation on the electric motor 31 and the control circuit board 64 and prolonging the life of the electric motor 31 and the life of the control circuit board 64. In some possible examples, the air inlet 72, the air outlet 73, and the control circuit board 64 are each disposed on one side of the central plane P1, and the battery pack mounting portion 27 is disposed on the other side of the central plane P1. With this configuration, the heat of the control circuit board 64 can be better dissipated so that the heat dissipation effect thereof is better.

The control circuit board 64 is disposed in the accommodating space 65. Specifically, the control circuit board 64 is disposed on the side of the midplane P1 facing the electric motor 31. That is to say, along the left and right direction, the control circuit board 64 is disposed on the left side of the midplane P1, the electric motor 31 is disposed on the left side of the midplane P1, and the battery pack mounting portion 27 is disposed on the right side of the midplane P1. That is, the control circuit board 64 is configured to be adjacent to the electric motor 31. The accommodating space 65 where the control circuit board 64 is disposed communicates with the interior space 251 where the electric motor 31 is disposed such that a flow channel of the airflow A is formed. The electric motor housing 25 is formed with a connection port 252. The airflow A entering the accommodating space 65 directly enters the interior space 251 from the connection port 252. The electric motor housing 25 includes a first electric motor housing 253 and a second electric motor housing 254. The first electric motor housing 253 and the second electric motor housing 254 are each fixedly connected to the main housing 22 and are combined to form the connection port 252 communicating with the accommodating space 65. The connection port 252 is at least partially located in the accommodating space 65. The first handle housing portion 612 is formed with a through hole via which the electric motor housing 25 can at least partially extend into the accommodating space 65. The through hole communicates with the connection port 252. The interior space 251 and the accommodating space 65 may communicate with each other via a third through space, that is, the interior space 251 and the accommodating space 65 may communicate with each other indirectly. The control circuit board 64 is disposed at the left end of the main handle 61 and configured to be adjacent to the electric motor 31. On the flow path of the airflow A, the airflow A needs to flow through the control circuit board 64, the electric motor 31, and the like. To provide the preceding heat dissipation path A, the air inlet 72 is configured to be adjacent to the control circuit board 64, or the control circuit board 64 and the electric motor 31 are disposed between the air inlet 72 and the air outlet 73. If the control circuit board 64 is disposed on the right side of the midplane P1, not only is a space needed for arranging the control circuit board 64, but also an enough space needs to be retained in the main body for disposing the heat dissipation channel. In addition, to make the structure of the main body reasonable, the heat dissipation channel is configured to be narrow and long under this condition. Therefore, a poor heat dissipation effect of the main body is caused. The air inlet 72 is disposed at the left end of the main handle 61. The air inlet 72 and the air outlet 73 are configured to be adjacent to each other. That is to say, the distance of the heat dissipation channel between the air inlet 72 and the air outlet 73 is relatively short. Thus, the air duct between the air inlet 72 and the air outlet 73 can be configured to be relatively spacious, thereby facilitating sufficient heat dissipation.

Along the extension direction of the electric motor axis 101, the fan 71 is disposed at the upper end of the electric motor 31, and at least 90% of the connection port 252 is configured to be located at the lower end of the electric motor 31. With this configuration, the airflow A entering from the connection port 252 can sufficiently flow through the electric motor 31 and then is discharged from the air outlet 73.

Figure 5:
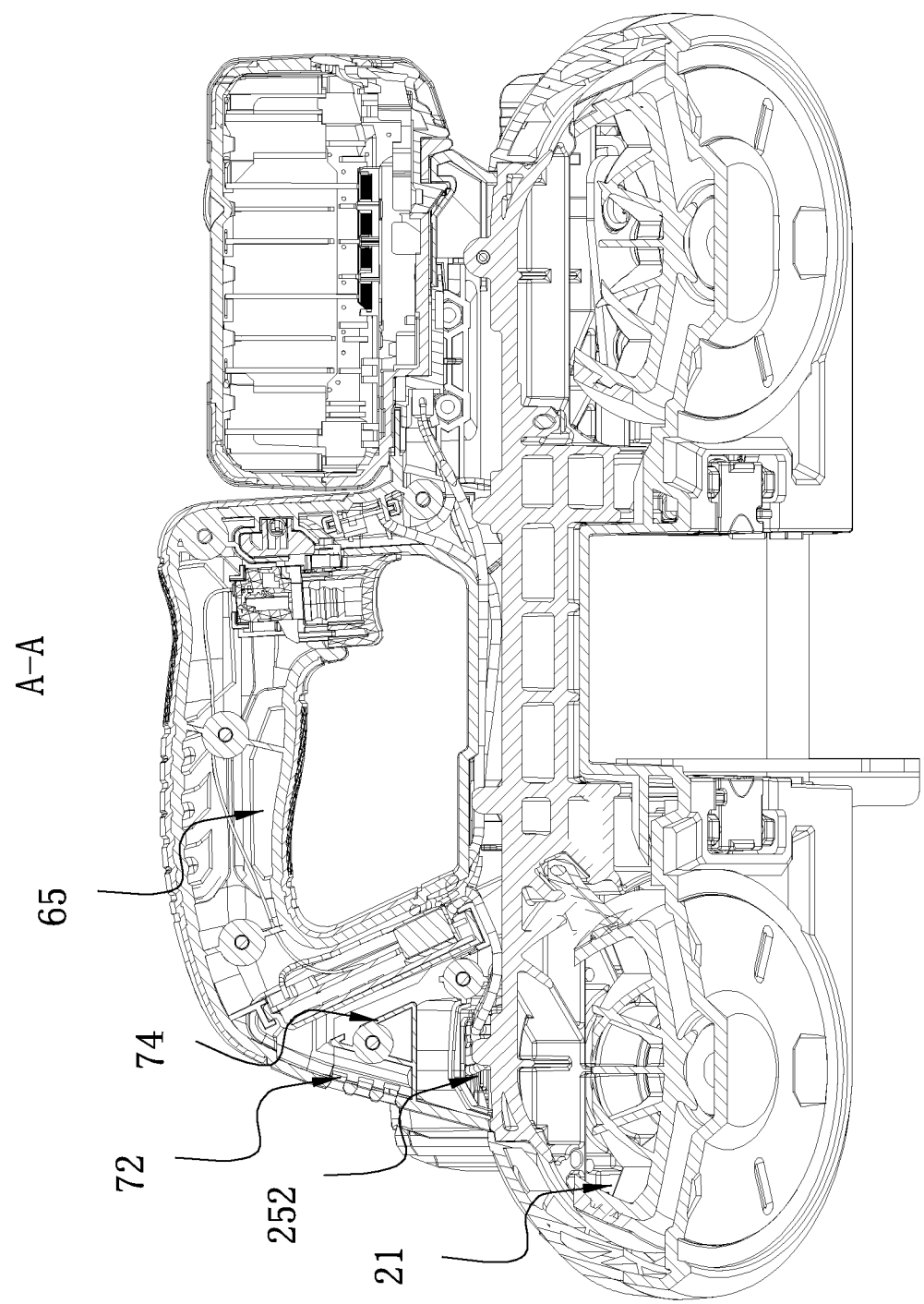
FIG. 5 is a sectional view of the handheld band saw shown in FIG. 4 along an A-A direction.
Figure 6:
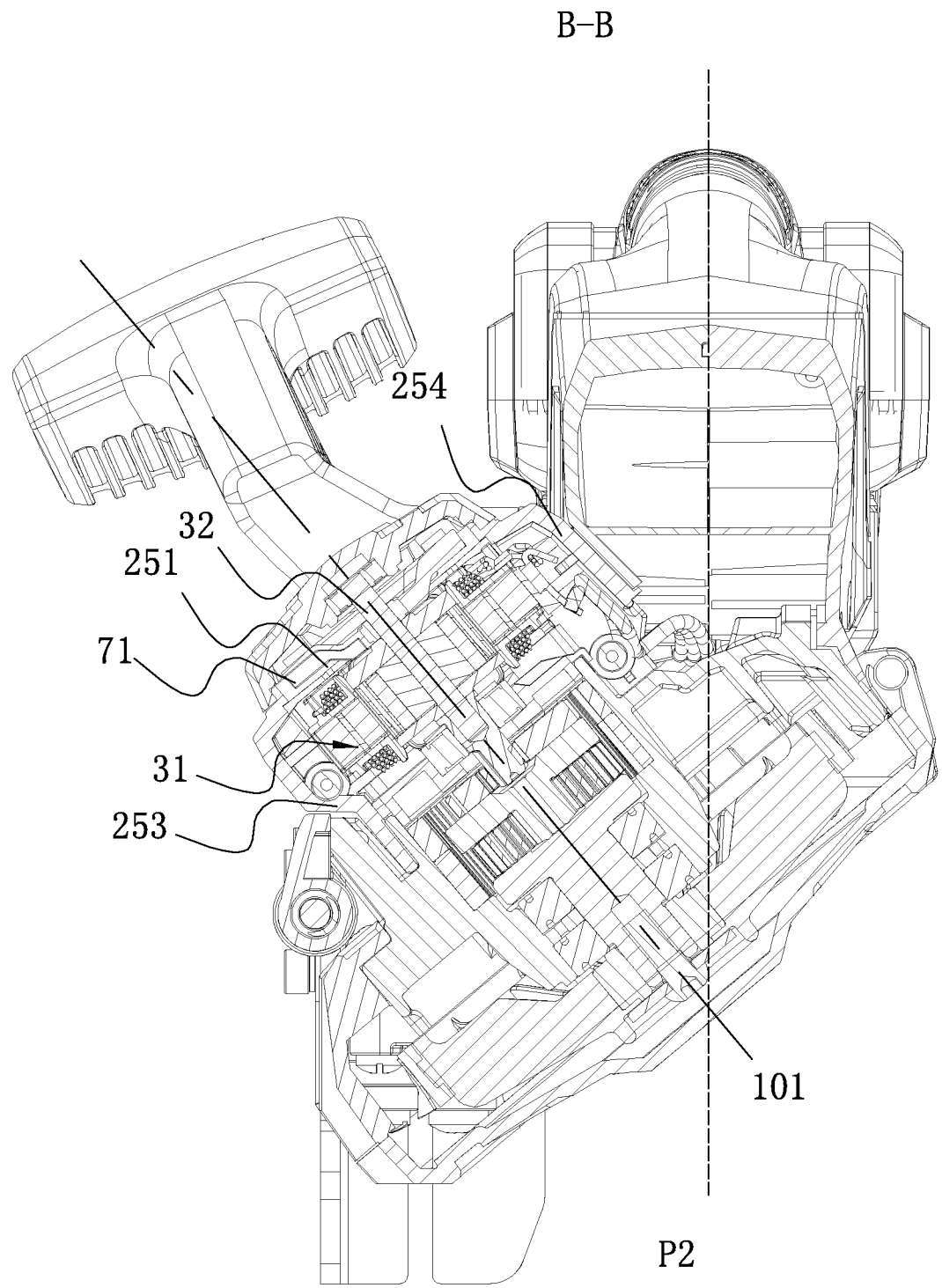
FIG. 6 is a sectional view of the handheld band saw shown in FIG. 4 along a B-B direction.
Figure 7:
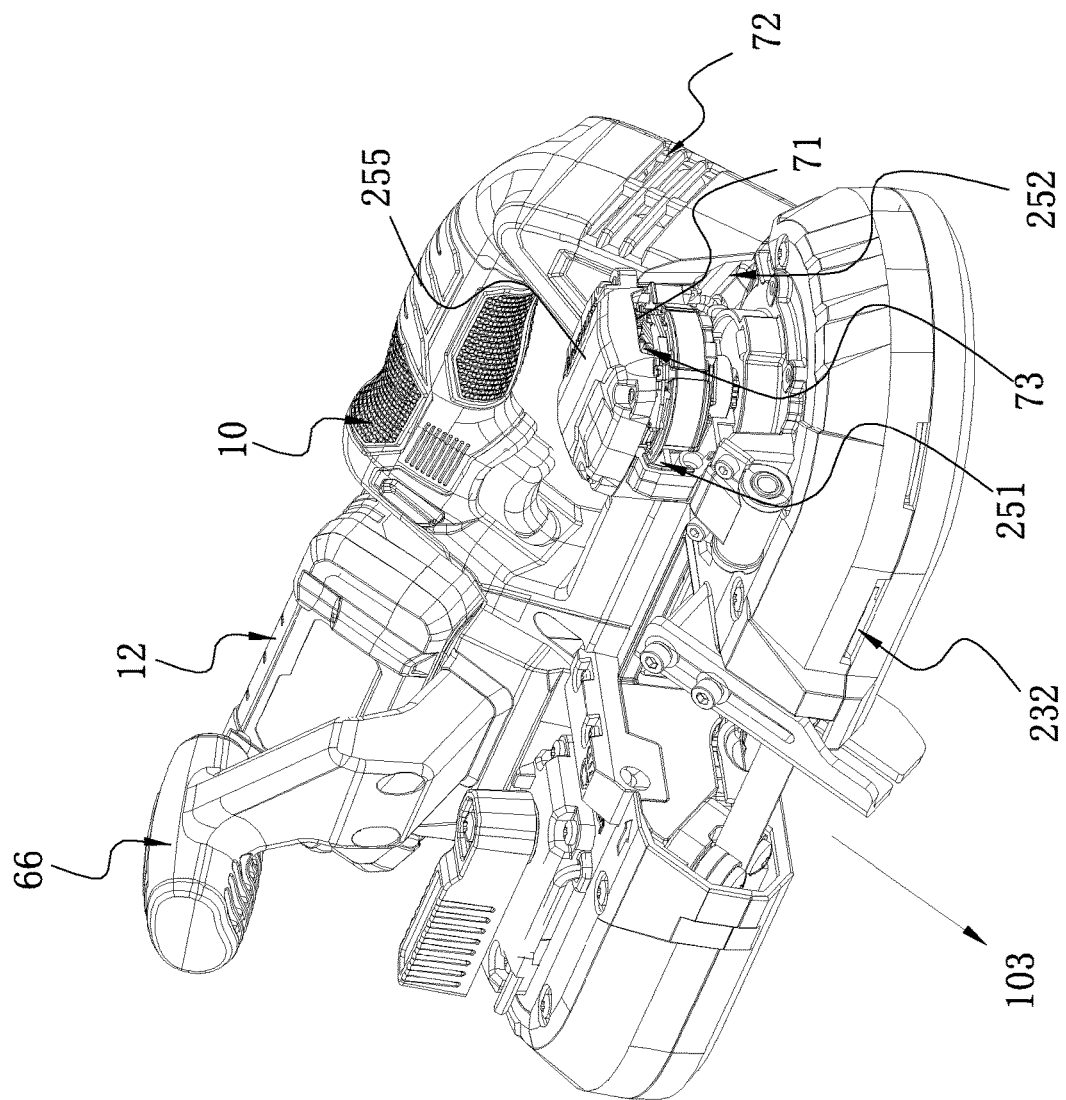
FIG. 7 is a schematic view showing part of the structures of the handheld band saw shown in FIG. 1.
Figure 8:
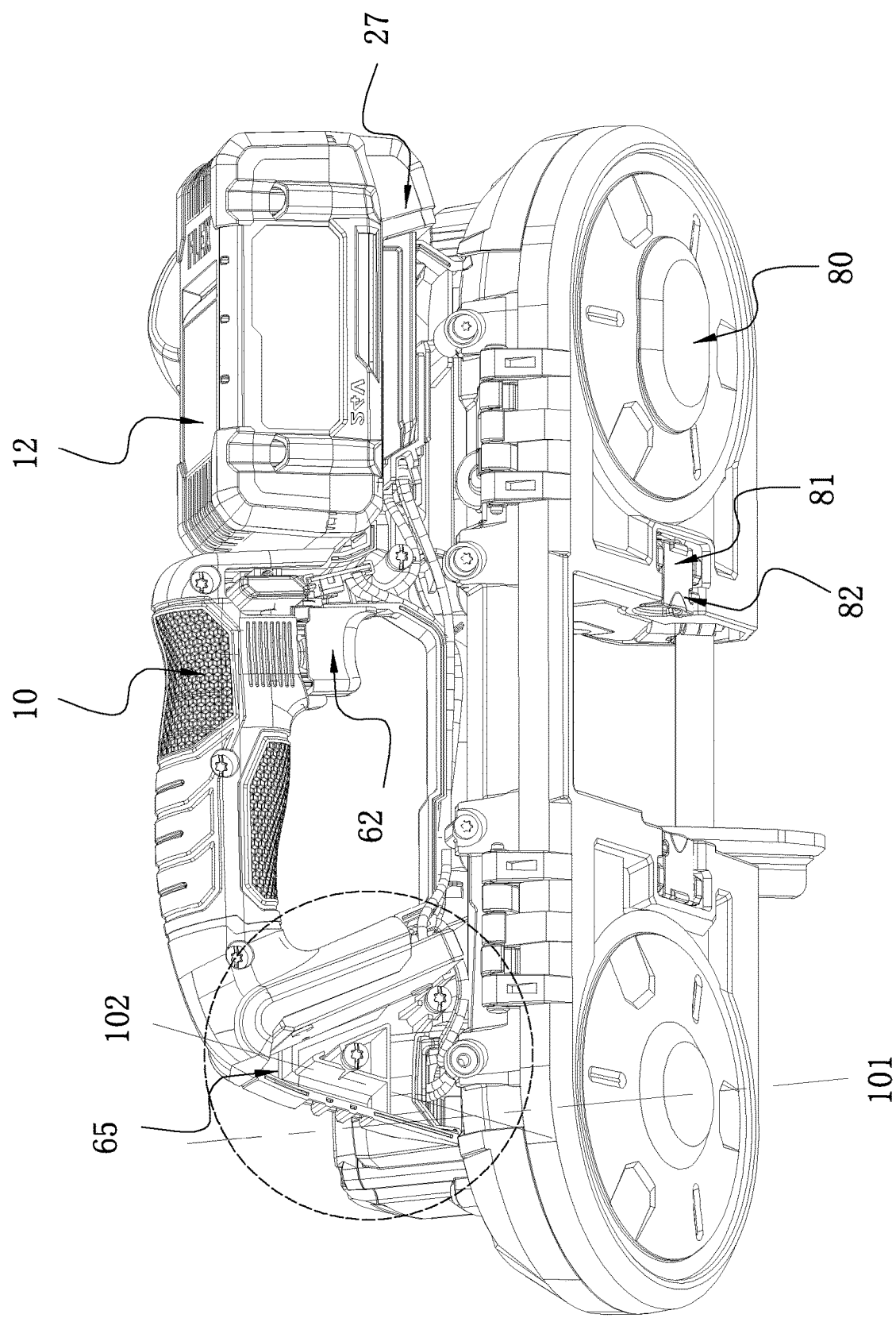
FIG. 8 is a schematic view showing part of the structures of the handheld band saw shown in FIG. 1.
Figure 11:
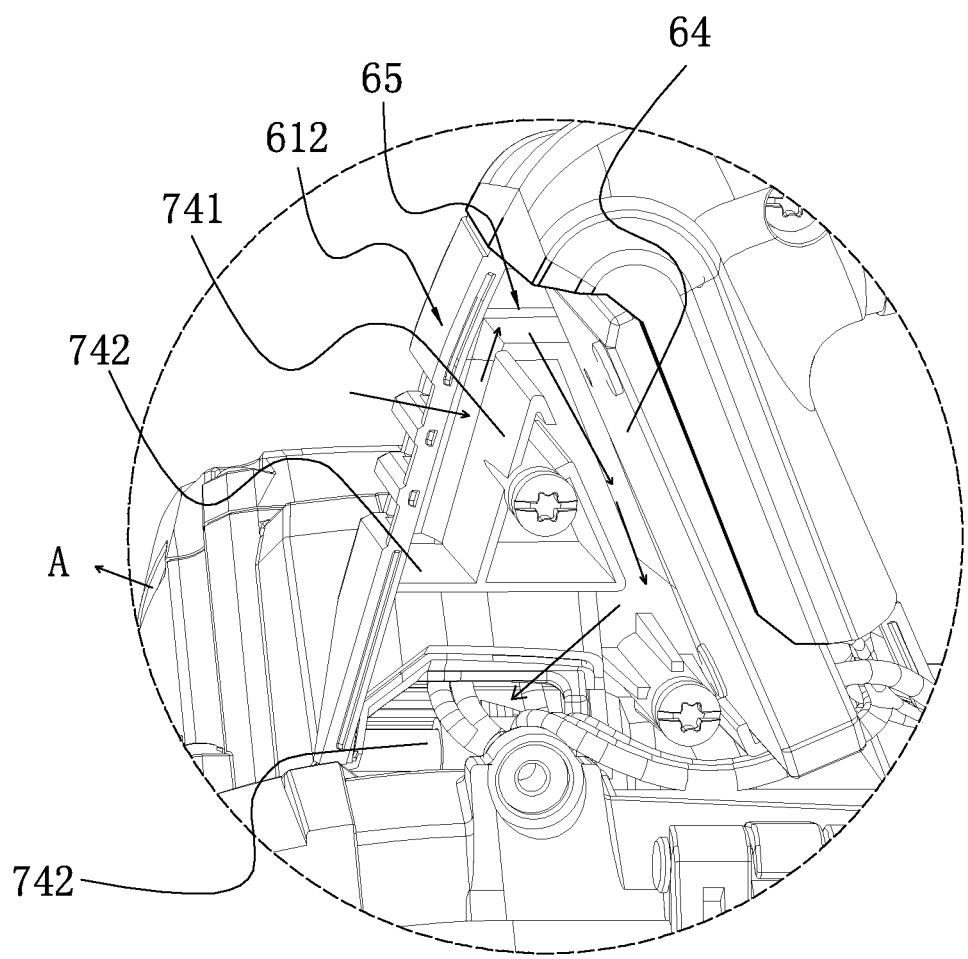
FIG. 11 is a partial enlarged view of the handheld band saw shown in FIG. 8.

As shown in FIGS. 5, 8, and 11, the control circuit board 64 is disposed in the left end of the main handle 61, and specifically, the control circuit board is configured to be oblique in the accommodating space 65. The heat dissipation device 70 further includes a flow guide structure 74 fixedly disposed in the accommodating space 65 and disposed between the air inlet 72 and the control circuit board 64. The control circuit board 64 is configured to be oblique in the accommodating space 65 and forms a space with the left end of the main handle 61, and the flow guide structure 74 is disposed in the space. The flow guide structure 74 is used for guiding the airflow A to flow to the control circuit board 64. The flow guide structure 74 is at least partially disposed between the air inlet 72 and the connection port 252. The flow guide structure 74 includes a first guide portion 741 and a second guide portion 742. The first guide portion 741 and the second guide portion 742 are each connected to the first handle housing portion 612 and the second handle housing portion 613. The first guide portion 741 is partially connected to the second guide portion 742. The first guide portion 741, the second guide portion 742, the first handle housing portion 612, and the second handle housing portion 613 are connected to form a stopper structure for restricting the airflow A entering from the air inlet 72 from directly entering the interior space 251. The first guide portion 741 extends substantially along a first direction 102, where the first direction 102 intersects the direction of the electric motor axis 101 obliquely. The airflow A entering from the air inlet 72 is guided by the first guide portion 741 to flow upward along the first direction 102, that is, the airflow A is guided to sufficiently flow to the control circuit board 64 to sufficiently dissipate the heat of the control circuit board 64.

The shield assembly 80 is connected to the housing assembly 20 and used for substantially covering the first rotating wheel 41 and the second rotating wheel 42. The shield assembly 80 is movably connected to the housing assembly 20 and has at least a first state and a second state during the movement of the shield assembly 80. When the shield assembly 80 is in the first state, the shield assembly 80 is relatively fixed to the housing assembly 20 and can substantially cover the rotating wheel assembly 40, which may be understood as the case where the shield assembly 80 is locked relative to the housing assembly 20. When the shield assembly 80 is in the second state, the shield assembly 80 is relatively movable relative to the housing assembly 20, which may be understood as the case where the shield assembly 80 is in a released state relative to the housing assembly 20.

The handheld band saw 100 further includes a locking device 81 movably connected to the housing assembly 20. The locking device 81 is used for locking and releasing the shield assembly 80 to cause the shield assembly 80 to switch between a first state and a second state. The locking device 81 includes at least one group of locking assemblies 82.

A locking assembly 82 includes a driving member 821, a stopper 822, a biasing member 823, and an abutting member 824. The driving member 821 has a retainable open position and a retainable closed position. The driving member 821 may be driven by the user to the open position or the closed position. When the driving member 821 is at the open position, the shield assembly 80 is in the second state. In this case, the user can open the shield assembly 80, replace the saw blade, clean chips, or the like. When the driving member 821 is at the closed position, the shield assembly 80 may be in the first state or may remain in the second state. When the shield assembly 80 is in the first state, the shield assembly 80 and the housing assembly 20 remain relatively fixed to each other. In this case, the user can start the electric motor 31 for cutting. When the driving assembly is at the closed position and the shield assembly 80 is in the second state, the shield assembly 80 is always in the moving state. The stopper 822 cooperates with the driving member 821 so that the driving member 821 can be retained at the open or closed position. The biasing member 823 always provides a driving force for the driving member 821 so that the driving member 821 is always remained at a current position without being driven by an external force. The abutting member 824 abuts against the driving member 821. With this configuration, the user only needs to drive the driving member 821 such that the locking assembly 82 can be opened or closed, so as to lock or release the shield assembly 80. In addition, the driving member 821 is always at the current position with being driven by the external force. That is to say, the user needs to operate, in only one step, the driving member 821 to release or lock the shield assembly 80, thereby facilitating the operation of the user.

Figure 9:
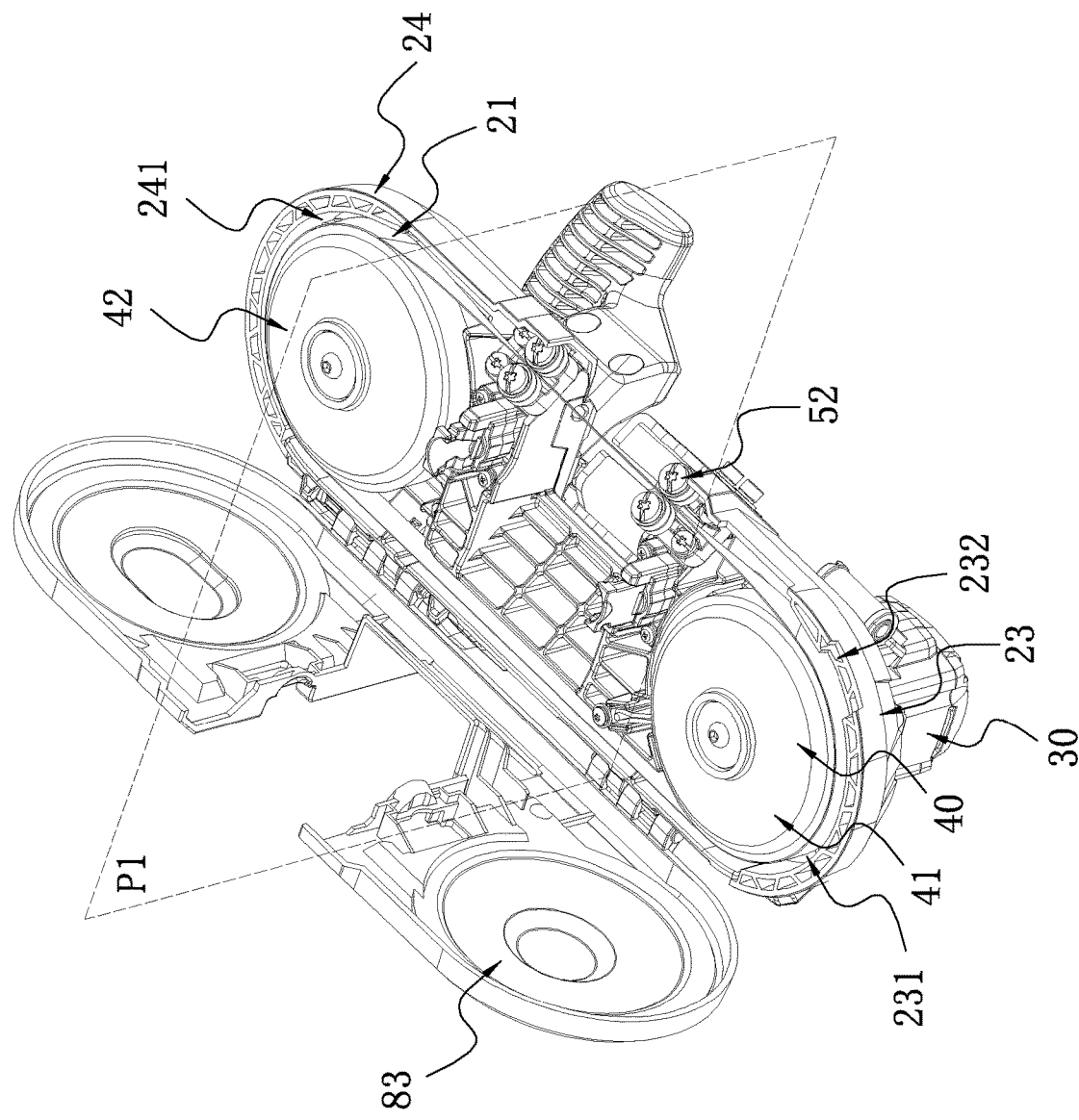
FIG. 9 is a schematic view of the handheld band saw shown in FIG. 1 with a shield housing opened.
Figure 10:
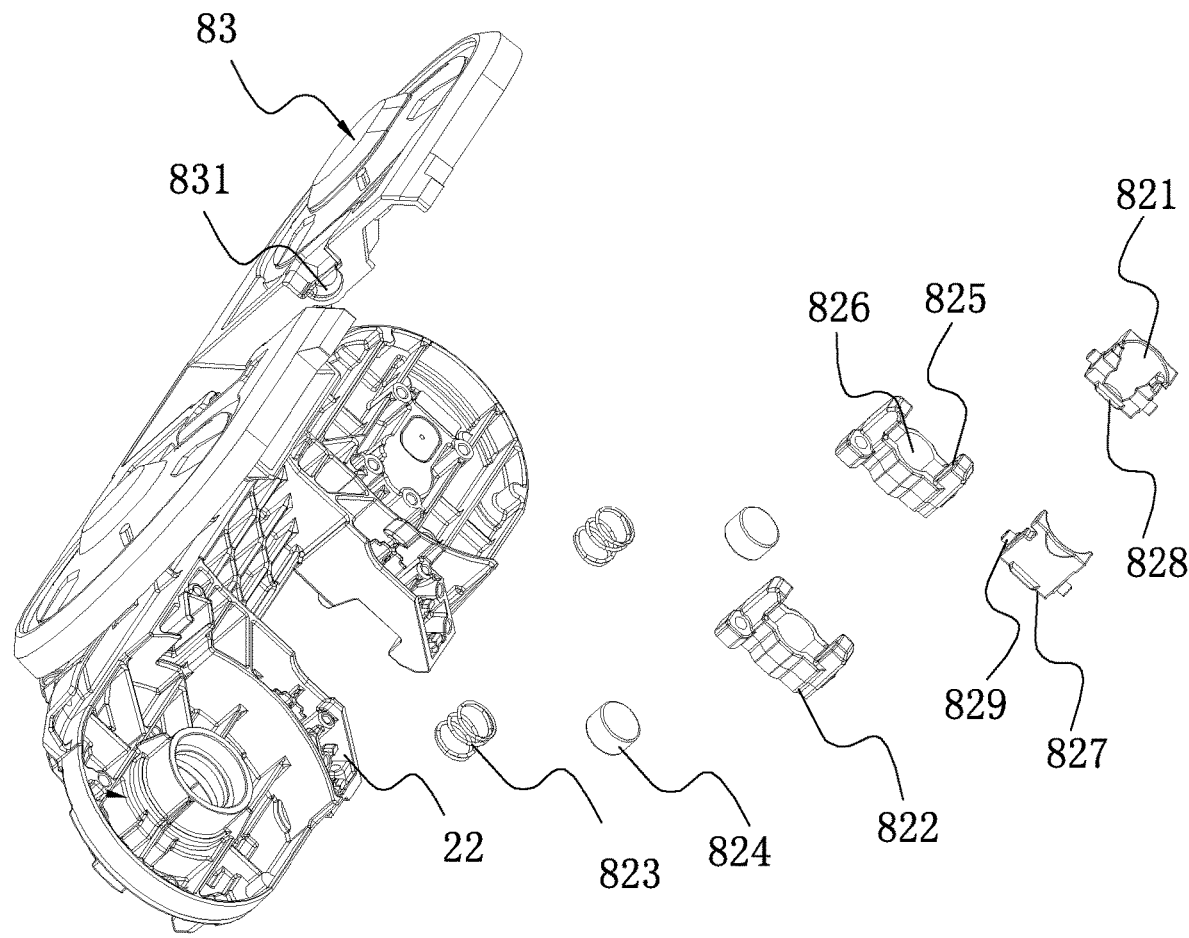
FIG. 10 is an exploded view of locking assemblies in the handheld band saw shown in FIG. 9.
Figure 12:
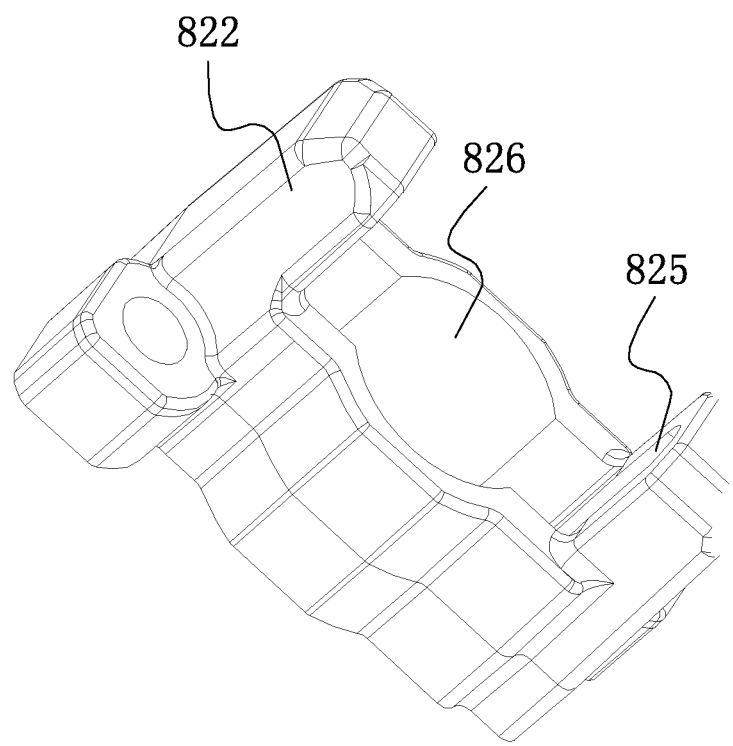
FIG. 12 is a perspective view of a stopper in a locking assembly shown in FIG. 9.

As shown in FIGS. 9, 10, and 12, the stopper 822 is fixedly connected to the main housing 22, and in this example, the stopper 822 is fixedly connected to the main housing 22 by a screw. The stopper 822 is formed with slide grooves 825 and a movement space 826. The slide grooves 825 protrude from the movement space 826, that is, the slide grooves 825 are at least partially disposed outside the movement space 826. The biasing member 823 is at least partially disposed in the movement space 826. One end of the biasing member 823 abuts against the main housing 22, and the other end of the biasing member 823 abuts against the abutting member 824. When the abutting member 824 is forced to move toward the main housing 22, the biasing member 823 is forced to be compressed in the movement space 826. When the external force applied to the abutting member 824 is removed, the biasing member 823 rebounds, and the other end of the biasing member 823 continues abutting against the abutting member 824. The abutting member 824 is at least partially disposed in the movement space 826. One end of the abutting member 824 abuts against the biasing member 823 and the other end the abutting member 824 abuts against the driving member 821, which may be understood as the case where the driving force of the biasing member 823 is transmitted to the driving member 821 through the abutting member 824. The driving member is partially disposed in the slide grooves 825, and the driving member 821 is movable relative to the slide grooves 825.

The driving member 821 cooperates with the stopper 822 so that the driving member 821 switches between the open position and the closed position in a retainable manner. The driving member 821 includes a first contact surface 827 and a second contact surface 828 which are not in the same plane. When the driving member 821 is at the open position, the first contact surface 827 is in contact with the abutting member 824, and when the driving member 821 is at the closed position, the second contact surface 828 is in contact with the abutting member 824. Specifically, the driving member 821 is rotatable relative to the stopper 822, where the driving member 821 is formed with two cylindrical connection portions 829 protruding outward and disposed in the slide grooves 825 of the stopper 822, and the driving force of the biasing member 823 causes the outer walls of the connection portions 829 to be always at least in contact with the inner walls of the slide grooves 825.

The shield assembly 80 includes at least one shield housing 83 rotatably connected to the main housing 22. In this example, the shield assembly 80 includes one shield housing 83. The shield housing 83 mates with the first rotating wheel housing 23 and the second rotating wheel housing 24 such that the first open space 231 and the second open space 241 can be substantially enclosed. The shield housing 83 includes a stopper portion 831 which can mate with the driving member 821. When the shield assembly 80 is in the first state, the stopper portion 831 is in contact with the driving member 821 so that the shield assembly 80 and the housing assembly 20 remain relatively fixed to each other substantially. When the shield assembly 80 is in the second state, the stopper portion 831 is not in contact with the driving member 821, and in this case, the shield housing 83 is rotatable relative to the main housing 22. As another example, the shield housing and the main housing may be separate from each other, that is, the shield housing may be separated from the main housing when the shield assembly is in the second state. That is to say, the shield housing may be detached from the main body as a separately placed component. The preceding example may be understood as the case where when the locking assembly is at the open position, the user may remove the shield housing, or when the user does not want to mount the shield housing, the driving member is made to be at the open position and then the shield housing is placed separately, and the cutting can be continued. When the user wants to use the shield housing, the user only needs to mount the shield housing to the main body and drive the driving member to the closed position.

As another possible example, the locking assembly 82 may be provided with no abutting member 824, that is, the biasing member 823 directly abuts against the driving member 821, and the preceding functions can also be implemented.

The locking assemblies 82 are configured to be adjacent to the cutting region 26. One group of locking assemblies 82 may be provided and used for locking the shield housing 83 and the main housing 22. Two groups of locking assemblies 82 may be provided. In this example, the locking assemblies 82 are disposed on two sides of the cutting region 26. Further, the two groups of locking assemblies 82 are configured to be symmetrical about the midplane P1. When the driving members 821 of the two groups of locking assemblies 82 are each at the open position, the shield housing 83 can be opened and is rotatable relative to the main housing 22. It is to be noted that the two groups of locking assemblies 82 have substantially the same structure and are only disposed at different positions.

The first rotating wheel housing 23 is provided with an elongated chip discharging port 232. When the main body 10 runs, superfluous chips attached to the saw blade during the cutting are discharged via the chip discharging port 232. The chip discharging port 232 is disposed at a position of the first rotating wheel housing 23 which is in contact with the shield housing 83 and adjacent to the cutting region 26. The first rotating wheel housing 23 may be provided with multiple chip discharging ports 232.

As shown in FIG. 1, the handle assembly 60 further includes an auxiliary handle portion 66 for the user to hold. When using the main body 10, the user may hold the handle portion 611 with one hand and hold the auxiliary handle portion 66 with the other hand. This configuration facilitates the hold of the user. The auxiliary handle portion 66 is fixedly connected to the housing assembly 20. Further, along the front and rear direction, the auxiliary handle portion 66 is disposed on the two sides of the midplane P1 relative to the electric motor 31, and along the left and right direction, the auxiliary handle portion 66 and the electric motor 31 are disposed on the left side of the handle midplane P2, which may be understood as the case where the handle portion 611 is not aligned with the auxiliary handle portion 66, and the auxiliary handle portion 66 is fixedly connected to the battery pack mounting portion 27, specifically, the auxiliary handle portion 66 is connected to the battery pack mounting portion 27 by screws. That is, the auxiliary handle portion 66 is disposed on a side surface of the battery pack mounting portion 27. With this configuration, when the user controls the handheld band saw 100 with both hands, the user can very conveniently control the cutting direction of the handheld band saw 100, thereby facilitating operation.

The basic principles, main features, and advantages of the present application are shown and described above. It is to be understood by those skilled in the art that the preceding examples are not intended to limit the present application in any form, and the technical solutions obtained by means of equivalent substitution or equivalent transformation are all within the scope of the present application.

What is claimed is:

1. A handheld band saw, comprising:
a housing assembly comprising a battery pack mounting portion for mounting a battery pack and a main handle formed with an accommodating space;
a rotating wheel assembly at least partially disposed in the housing assembly and comprising a first rotating wheel and a second rotating wheel, wherein the first rotating wheel and the second rotating wheel are configured to be substantially symmetrical about a midplane;
an electric motor disposed in the housing assembly and capable of driving one of the first rotating wheel and the second rotating wheel to rotate;
a fan which is capable of generating an airflow in the housing assembly during rotation; and
a control circuit board disposed in the accommodating space of the housing assembly,
wherein the control circuit board is disposed on a side of the midplane facing the electric motor, the electric motor and the battery pack mounting portion are located on two sides of the midplane, the housing assembly is formed with an air inlet and an air outlet and, when the fan rotates, the airflow entering the housing assembly from the air inlet flows through at least the control circuit board and the electric motor.

2. The handheld band saw according to claim 1, wherein, when the fan rotates, the airflow entering the housing assembly from the air inlet flows through the control circuit board and then flows through the electric motor.

3. The handheld band saw according to claim 1, wherein the main handle is provided with the air inlet.

4. The handheld band saw according to claim 3, wherein the housing assembly comprises an electric motor housing formed with an interior space for accommodating the electric motor, the interior space communicates with the accommodating space, and the electric motor housing comprises a connection port from which the airflow enters the interior space.

5. The handheld band saw according to claim 4, wherein a flow guide structure disposed at an end of the main handle facing the electric motor is disposed in the accommodating space, the flow guide structure comprises a first guide portion and a second guide portion, and the first guide portion and the second guide portion cooperate with an inner wall of the main handle so that the airflow flows to the control circuit board and then flows to the connection port.

6. The handheld band saw according to claim 3, wherein the air inlet is disposed at a left end of the main handle, and the housing assembly is provided with the air outlet which is adjacent to the fan.

7. The handheld band saw according to claim 1, wherein the control circuit board is disposed in the main handle and is configured to be adjacent to a left end of the main handle.

8. The handheld band saw according to claim 1, wherein the handheld band saw further comprises an auxiliary handle portion connected to the battery pack mounting portion.

9. The handheld band saw according to claim 8, wherein the main handle is configured to be substantially symmetrical about a handle midplane, and the auxiliary handle portion and the electric motor are located on a same side of the handle midplane.

10. The handheld band saw according to claim 1, wherein the air outlet and the air inlet are disposed on a same side of the midplane.

11. The handheld band saw according to claim 1, wherein the air outlet, the air inlet, and the control circuit board are disposed on one side of the midplane, and the battery pack mounting portion is located on another side of the midplane.

12. The handheld band saw according to claim 1, further comprising a shield assembly connected to the housing assembly and having at least a first state in which the shield assembly is fixed relative to the housing assembly and is capable of substantially covering the rotating wheel assembly and a second state in which the shield assembly is movable relative to the housing assembly, and
- a locking device connected to the housing assembly and comprising at least one group of locking assemblies, wherein each of the at least one group of locking assemblies comprises:
- a driving member having an open position which is retainable and a closed position which is retainable, wherein the shield assembly is in the second state when the driving member is at the open position, and the shield assembly is capable of being in the first state when the driving member is at the closed position;
- a stopper cooperating with the driving member so that the driving member is retainable at the open position or the closed position; and
- a biasing member providing a driving force for the driving member so that the driving member is always retained at a current position without being driven by an external force.

13. The handheld band saw according to claim 12, wherein the electric motor drives the first rotating wheel to rotate, the housing assembly comprises a first rotating wheel housing which substantially accommodates the first rotating wheel and a second rotating wheel housing which substantially accommodates the second rotating wheel, the shield assembly comprises a shield housing capable of mating with the first rotating wheel housing and the second rotating wheel housing to substantially cover the first rotating wheel and the second rotating wheel, and the first rotating wheel housing is provided with a chip discharging port.

14. A handheld band saw, comprising:
- a housing assembly comprising a battery pack mounting portion for mounting a battery pack;
- a rotating wheel assembly at least partially disposed in the housing assembly and comprising a first rotating wheel and a second rotating wheel, wherein the first rotating wheel and the second rotating wheel are configured to be substantially symmetrical about a midplane;
- an electric motor disposed in the housing assembly and capable of driving one of the first rotating wheel and the second rotating wheel to rotate;
- a control circuit board disposed in the housing assembly; and
- a fan which is capable of generating an airflow flowing through the control circuit board in the housing assembly during rotation,
- wherein the control circuit board and the electric motor are located on a same side of the midplane,
- wherein the housing assembly comprises a main handle formed with an accommodating space, the control circuit board is disposed in the accommodating space, and the main handle is provided with an air inlet, and
- wherein the air inlet is disposed at a left end of the main handle, and the housing assembly is provided with an air outlet which is adjacent to the fan.

15. The handheld band saw according to claim 14, wherein the airflow flows through the control circuit board and then flows to the electric motor.

* * * * *